(12) United States Patent
Korodi et al.

(10) Patent No.: US 10,848,783 B2
(45) Date of Patent: Nov. 24, 2020

(54) SIGNIFICANCE MAP ENCODING AND DECODING USING PARTITION SELECTION

(71) Applicant: Velos Media, LLC, Plano, TX (US)

(72) Inventors: Gergely Ferenc Korodi, Waterloo (CA); Jinwen Zan, Beijing (CN); Dake He, Waterloo (CA)

(73) Assignee: Velos Media, LLC, Dallas, TX (US)

( * ) Notice: Subject to any disclaimer, the term of this patent is extended or adjusted under 35 U.S.C. 154(b) by 0 days.

(21) Appl. No.: 16/597,829

(22) Filed: Oct. 9, 2019

(65) Prior Publication Data

US 2020/0045337 A1 Feb. 6, 2020

Related U.S. Application Data

(63) Continuation of application No. 15/712,640, filed on Sep. 22, 2017, now Pat. No. 10,448,052, which is a
(Continued)

(51) Int. Cl.
| | |
|---|---|
| *H04N 11/02* | (2006.01) |
| *H04N 19/60* | (2014.01) |
| *H04N 19/13* | (2014.01) |
| *H04N 19/625* | (2014.01) |
| *H04N 19/18* | (2014.01) |
| *H04N 19/169* | (2014.01) |
| *H04N 19/136* | (2014.01) |

(Continued)

(52) U.S. Cl.
CPC ............ *H04N 19/60* (2014.11); *H04N 19/13* (2014.11); *H04N 19/136* (2014.11); *H04N 19/18* (2014.11); *H04N 19/1883* (2014.11); *H04N 19/44* (2014.11); *H04N 19/625* (2014.11); *H04N 19/91* (2014.11)

(58) Field of Classification Search
CPC ...................................................... H04N 19/60
USPC .............................................. 375/240.01–29
See application file for complete search history.

(56) References Cited

U.S. PATENT DOCUMENTS

| | | |
|---|---|---|
| 5,751,859 A | 5/1998 | Howard |
| 7,356,085 B2 | 4/2008 | Gavrilescu et al. |
| (Continued) | | |

FOREIGN PATENT DOCUMENTS

| | | |
|---|---|---|
| TW | I334278 B | 12/2010 |
| TW | I335147 B | 12/2010 |
| (Continued) | | |

OTHER PUBLICATIONS

Auyeung, "AHG5: Harmonization and complexity reduction of context selection of 4×4 and 8×8 significant coeff_flag", MPEP Meeting, document JCTVC-I0271_r1, dated Apr. 28, 2012, XP030052861.

(Continued)

*Primary Examiner* — Leron Beck
(74) *Attorney, Agent, or Firm* — Spencer C. Patterson; Grable Martin Fulton PLLC

(57) ABSTRACT

Methods of encoding and decoding for video data are describe in which significance maps are encoded and decoded using non-spatially-uniform partitioning of the map into parts, wherein the bit positions within each part are associated with a given context. Example partition sets and processes for selecting from amongst predetermined partition sets and communicating the selection to the decoder are described.

21 Claims, 9 Drawing Sheets

Related U.S. Application Data continuation of application No. 15/288,115, filed on Oct. 7, 2016, now Pat. No. 9,774,885, which is a continuation of application No. 14/824,197, filed on Aug. 12, 2015, now Pat. No. 9,491,486, which is a continuation of application No. 14/525,329, filed on Oct. 28, 2014, now Pat. No. 9,143,801, which is a continuation of application No. 13/279,397, filed on Oct. 24, 2011, now Pat. No. 8,891,630.

(51) Int. Cl.
*H04N 19/44* (2014.01)
*H04N 19/91* (2014.01)

(56) References Cited

U.S. PATENT DOCUMENTS

| | | | |
|---|---|---|---|
| 7,379,608 | B2 | 5/2008 | Marpe et al. |
| 2005/0286634 | A1 | 12/2005 | Duvivier |
| 2008/0219578 | A1* | 9/2008 | Lee .................. H03M 7/4006 382/247 |
| 2009/0323809 | A1 | 12/2009 | Raveendran |
| 2010/0195715 | A1 | 8/2010 | Liu et al. |
| 2011/0194613 | A1 | 8/2011 | Chen et al. |
| 2012/0081241 | A1 | 4/2012 | Misra et al. |
| 2012/0082232 | A1 | 4/2012 | Rojals et al. |
| 2012/0082234 | A1 | 4/2012 | Lou et al. |
| 2012/0207400 | A1 | 8/2012 | Sasai et al. |

FOREIGN PATENT DOCUMENTS

| | | |
|---|---|---|
| TW | I335150 B | 12/2010 |
| WO | 2011142817 A1 | 11/2011 |
| WO | 2011128303 A3 | 2/2012 |

OTHER PUBLICATIONS

Bossen, F., "Common test conditions and software reference configurations", JCTVC-F900, JCT-VC of ITU-T SG16 WP3 and ISO/IEC JTC1/SC29/WG11, 6th Meeting, Torino, Jul. 2011.
Bross, B., et al., "WD4: Working Draft 4 of High-Efficiency Video Coding", JCT-VC of ITU-T SG16 WP3 and ISO/IEC JTC1/SC29/WG11, 6th Meeting, Torino, Jul. 2011.
Chengjie, et al., "Context-Based Entropy Coding of Block Transform Coefficients for Image Compression", IEEE, Nov. 11, 2002, XP0110074327.
CN Office Action dated Sep. 8, 2015, Application No. 201210411563.0.
EPO, Communication Pursuant to Article 94(3) EPC relating to application No. 11186392.4 dated Jul. 11, 2013.
EPO, Communication pursuant to Article 94(3) EPC, relating to application No. 14170478.3, dated Mar. 28, 2018.
EPO, Extended European Search Report relating to application No. 11186392.4 dated May 24, 2012.
EPO, Extended European Search Report relating to Application No. 14170478.3, dated Dec. 17, 2014.
EPO, Partial Extended European Search Report relating to Application No. 14170478.3, dated Jul. 22, 2014.
Japanese Patent Office, Japanese Office Action relating to Application No. 2012-233936, dated Dec. 2, 2013.
Korodi, Gergely, et al., "Encoding and decoding significant coefficient flags for 11-18 small Transform Units using partition sets", Joint Collaborative Team on Video Coding (JCT-VC_ of ITU-T SG16 WP3 and ISO/IEC JTC1/SC29/WG11 7th Meeting: Geneva, Nov. 21-30, 2011, vol. JCTVC-G657, Nov. 9, 2011, XP55013752.
Marpe, et al. "Context-Based Adapative Binary Arithmetic Coding in the H.264/AVC Video Compression Standard", IEEE Transactions on Circuits and Systems for Video Technology, vol. 13, No. 7, dated Jul. 1, 2003, XP011099255.
Min, et al., "Adaptive significance map coding for large transform", JCTVC-F598, Jul. 16, 2011, XP030009621.
Nguyen, et al., "Improved Context Modeling for Coding Quantized Transform Coefficients in Video Compression", Dec. 8, 2012, XP030082008.
Peng, et al., "CE6.b Report of Test 3: Interaction between SDIP and MDCS", MPEG Meeting, document No. JCTV-F197, dated Jul. 12, 2011, XP030049179.
Piao, et al., "Reduced contexts for significance map coding of large transform in CABAC", MPEG Meeting, document JCTVC-G768, dated Nov. 28, 2011, XP030050901.
SIPO, Chinese Office Action relating to Application No. 201210411563.0, dated Feb. 2, 2015.
SIPO, CN Examiner's Report relating to CN application No. 201610313043.4, dated Apr. 3, 2018.
TIPO, TW Office Action relating to application No. 101139364, dated Jan. 28, 2015.
Tu, et al., "Context-Based Entropy Coding of Block Transform Coefficients for Image Compression", IEEE Transactions on Image Processing, vol. 11, No. 11, dated Nov. 1, 2002, XP011074327.
United States District Court, Northern District of Texas, Dallas Division, Case 3:16-cv-02185-G Document 1 filed Jul. 27, 2016, p. 1 of 115.
Winken, et al., "Video Coding Technology Proposal by Fraunhofer HHI", JCT-VC Meeting: document JCTVC-A116, dated Apr. 24, 2010, XP030007556.
U.S. Appl. No. 15/712,640, filed Sep. 22, 2017, now U.S. Pat. No. 10,448,052.
U.S. Appl. No. 15/288,115, filed Oct. 7, 2016, now U.S. Pat. No. 9,774,885.
U.S. Appl. No. 14/824,197, filed Aug. 12, 2015, now U.S. Pat. No. 9,491,486.
U.S. Appl. No. 14/525,329, filed Oct. 28, 2014, now U.S. Pat. No. 9,143,801.
U.S. Appl. No. 13/279,397, filed Oct. 24, 2011, now U.S. Pat. No. 8,891,630.

\* cited by examiner

SIGNIFICANCE MAP ENCODING AND DECODING USING PARTITION SELECTION

CROSS-REFERENCE TO RELATED APPLICATIONS

The present application is a continuation of U.S. application Ser. No. 15/712,640 filed Sep. 22, 2017, which is a continuation of U.S. application Ser. No. 15/288,115 filed Oct. 7, 2016, now U.S. Pat. No. 9,774,885, which is a continuation of U.S. application Ser. No. 14/824,197 filed Aug. 23, 2015, now U.S. Pat. No. 9,491,586, which is a continuation of U.S. application Ser. No. 14/525,329 filed Oct. 28, 2014, now U.S. Pat. No. 9,143,801, which is a continuation of U.S. application Ser. No. 13/279,397 filed Oct. 24, 2011, now U.S. Pat. No. 8,891,630, the contents of all of which are hereby incorporated by reference.

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices for encoding and decoding significance maps for video using partition selection.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU: High Efficiency Video Coding (HEVC).

There are a number of standards for encoding/decoding images and videos, including H.264, that uses block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC (also called H.265) will also have these features.

When spectrally transforming residual data, many of these standards prescribe the use of a discrete cosine transform (DCT) or some variant thereon. The resulting DCT coefficients are then quantized using a quantizer to produce quantized transform domain coefficients, or indices.

The block or matrix of quantized transform domain coefficients (sometimes referred to as a "transform unit") is then entropy encoded using a particular context model. In H.264/AVC and in the current development work for HEVC, the quantized transform coefficients are encoded by (a) encoding a last significant coefficient position indicating the location of the last non-zero coefficient in the block, (b) encoding a significance map indicating the positions in the block (other than the last significant coefficient position) that contain non-zero coefficients, (c) encoding the magnitudes of the non-zero coefficients, and (d) encoding the signs of the non-zero coefficients. This encoding of the quantized transform coefficients often occupies 30-80% of the encoded data in the bitstream.

The entropy encoding of the symbols in significance map is based upon a context model. In the case of a 4×4 luma or chroma block or transform unit (TU), a separate context is associated with each coefficient position in the TU. That is, the encoder and decoder track a total of 30 (excluding the bottom right corner positions) separate contexts for 4×4 luma and chroma TUs. The 8×8 TUs are partitioned (conceptually for the purpose of context association) into 2×2 blocks such that one distinct context is associated with each 2×2 block in the 8×8 TU. Accordingly, the encoder and decoder track a total of 16+16=32 contexts for the 8×8 luma and chroma TUs. This means the encoder and decoder keep track of and look up 62 different contexts during the encoding and decoding of the significance map. When 16×16 TUs and 32×32 TUs are taken into account, the total number of distinct contexts involved is 88. This operation is also intended to be carried out at high computational speed.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
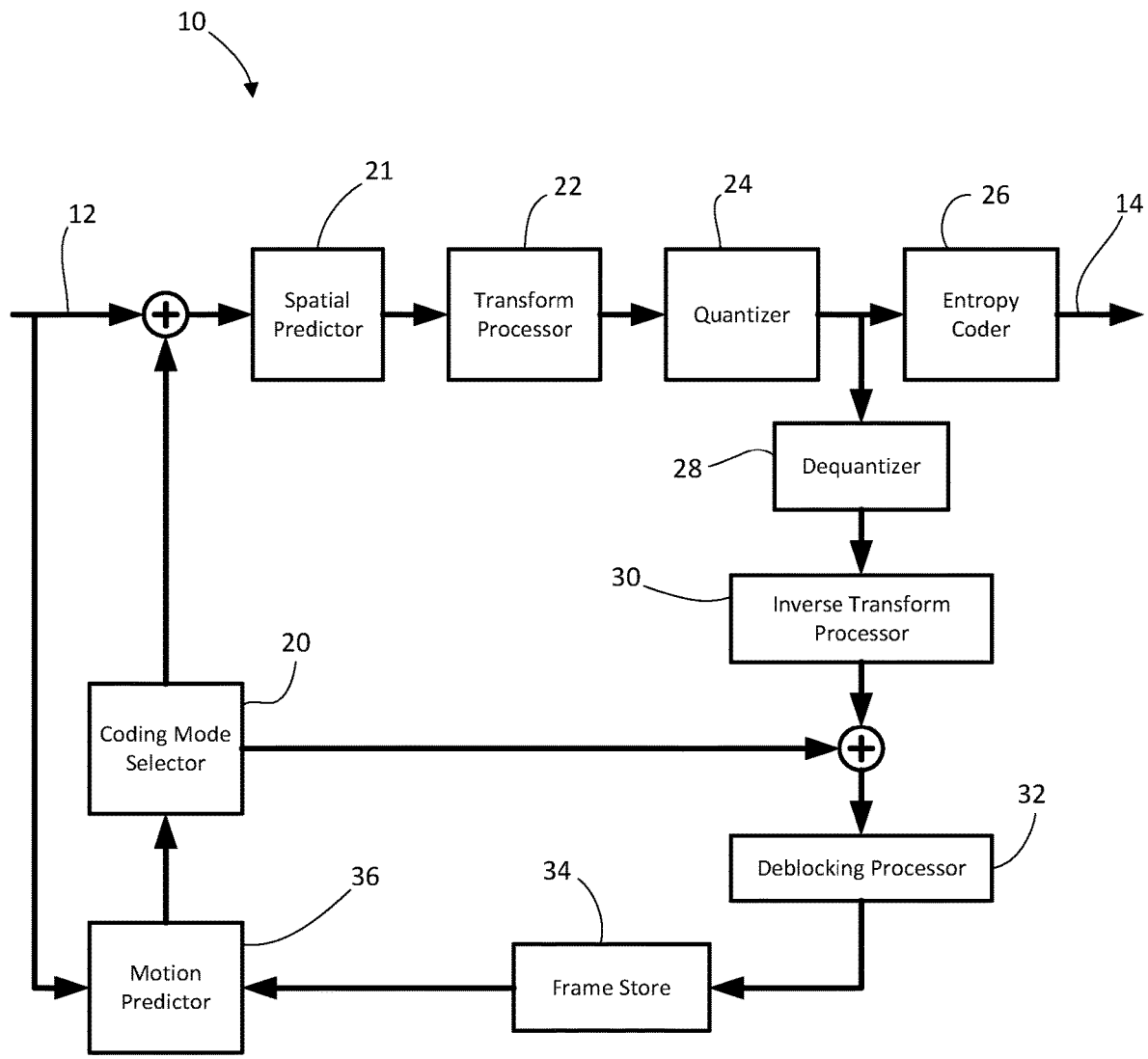
FIG. 1 shows, in block diagram form, an encoder for encoding video.

The present application describes methods and encoders/decoders for encoding and decoding significance maps with context-adaptive encoding or decoding. The encoder and decoder feature a non-spatially-uniform partitioning of the map into parts, wherein the bit positions within each part are associated with a given context. Example partition sets and processes for selecting from amongst predetermined partition sets and communicating the selection to the decoder are described below.

In one aspect, the present application describes a method of decoding a bitstream of encoded data to reconstruct a significance map for a transform unit. The method includes, for each bit position in the significance map, determining a context for that bit position based upon a partition set, decoding the encoded data based on the determined context to reconstruct a bit value, and updating the context based on that reconstructed bit value, wherein the reconstructed bit values form the decoded significance map.

In another aspect, the present application describes a encoding a significance map for a transform unit. The method includes, for each bit position in the significance map, determining a context for that bit position based upon a partition set, encoding a bit value at that bit position based on the determined context to generate encoded data, and updating the context based on that bit value, wherein the encoded data forms an encoded significance map.

In yet another aspect, the present application describes a method of decoding a bitstream of encoded data to reconstruct a significance map for a transform unit. The method includes, for each bit position in the significance map having a significant coefficient flag that is to be decoded using context-adaptive decoding, determining a context for that bit position based upon a partition set, decoding the encoded data based on the determined context to reconstruct a bit value, and updating the context based on that reconstructed bit value. In one aspect, the reconstructed bit values form the decoded significance map, the transform unit is sized 4×4, and the partition set assigns contexts to bit positions within the transform unit such that a different context is assigned to each bit position in an upper left quadrant of the transform unit, contexts are shared by groups of two in an upper right and lower left quadrant of the transform unit, and a single context is shared by all bit positions in the lower right quadrant.

In yet an additional aspect, the present application describes decoding a bitstream of encoded data to reconstruct significance maps for transform units. The method includes context adaptively decoding a first significance map for a first transform unit using a first partition set Q where each position (i,j) to be decoded in the first significance map is decoded using a corresponding context Q(i,j) assigned to that position (i,j) by the first partition set Q; determining at a largest coding unit boundary that a second partition set P is to be used for decoding significance maps of transform units instead of the first partition set Q; based on the determining, initializing contexts of the second partition set P, wherein, for each position (i,j) of the second partition set, a context P(i,j) is initialized with the corresponding context of Q(i,j) of the first partition set Q; and context adaptively decoding a second significance map for a second transform unit using the second partition set P. The second partition set P has a greater number of contexts than the first partition set Q such that there is a mapping, T, with T(P(i,j))=Q(i,j) for each position (i,j).

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding and/or the developing HEVC standard. Those ordinarily skilled in the art will understand that the present application is not limited to H.264/AVC or HEVC but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. It will also be appreciated that certain encoding/decoding operations are performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to transform units, coding units, groups of coding units, etc., as will become apparent in light of the description below.

Figure 2:
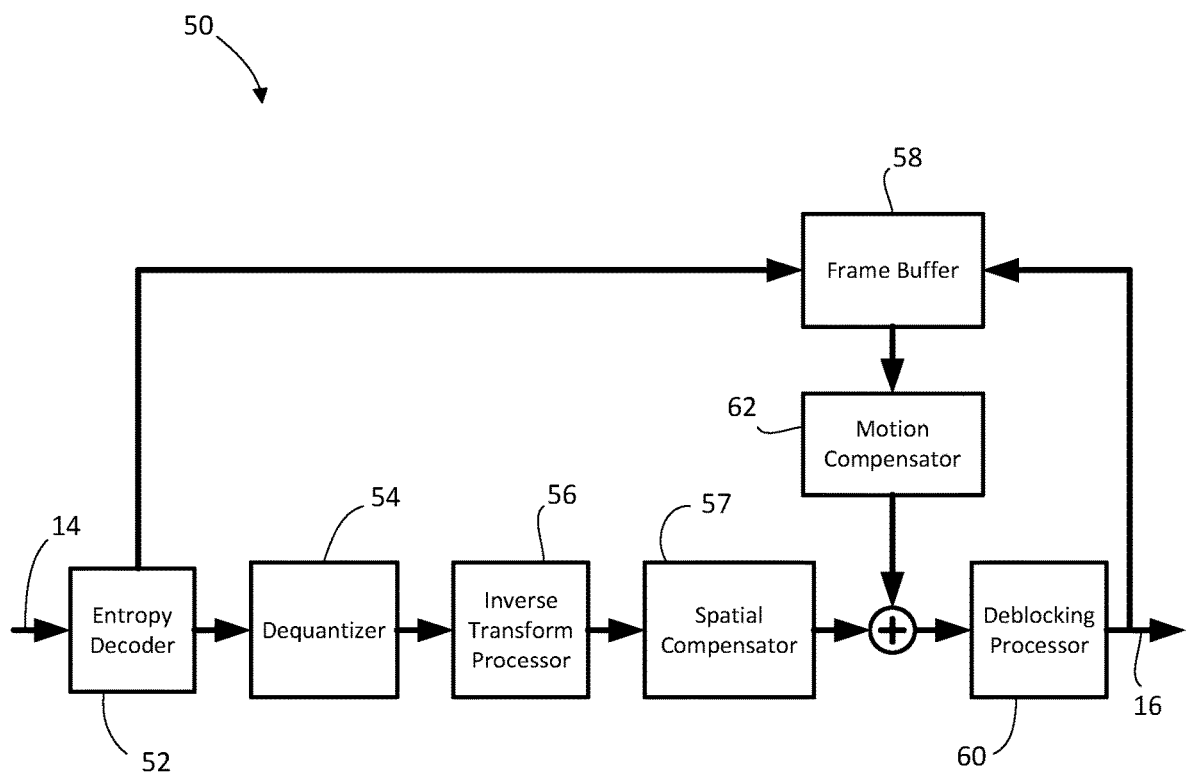
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like HEVC.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a macroblock or sub-block basis, depending on the size of the macroblocks. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing H.264 encoders.

The decoder 50 includes an entropy decoder 52, dequantizer 54, inverse transform processor 56, spatial compensator 57, and deblocking processor 60. The deblocking processor 60 may include deblocking and filtering processors. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock, the recreated "video data" is the residual data for use in spatial compensation relative to a previously decoded block within the frame. The spatial compensator 57 generates the video data from the residual data and pixel data from a previously decoded block. In other cases, such as inter-coded macroblocks, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock. It does so based on the reference frame information and motion vector specified for the inter-coded macroblock. It then supplies the reference block pixel data for combination with the residual data to arrive at the reconstructed video data for that macroblock.

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that HEVC-compliant encoders and decoders will have many of these same or similar features.

Significance Map Encoding

As noted above, the entropy coding of a block or set of quantized transform domain coefficients includes encoding the significance map for that block or set of quantized transform domain coefficients. The significance map is a binary mapping of the block indicating in which positions (other than the last position) non-zero coefficients appear. The block may have certain characteristics with which it is associated. For example, it may be from an intra-coded slice or an inter-coded slice. It may be a luma block or a chroma block. The QP value for the slice may vary from slice to slice. All these factors may have an impact on the best manner in which to entropy encode the significance map.

The significance map is converted to a vector in accordance with the scan order (which may be vertical, horizontal, diagonal, zig zag, or any other scan order prescribed by the applicable coding standard). Each significant bit is then entropy encoded using the applicable context-adaptive coding scheme. For example, in many applications a context-adaptive binary arithmetic coding (CABAC) scheme may be used. Other implementations may use other context-adaptive codecs with binarization. Examples include binary arithmetic coding (BAC), variable-to-variable (V2V) coding, and variable-to-fixed (V2F) length coding. For each bit position, a context is assigned. When encoding the bit in that bit position, the assigned context, and the context's history to that point, determine the estimated probability of a least probable symbol (LPS) (or in some implementations a most probable symbol (MPS)).

In existing video coders, context assignment is predetermined for both the encoder and decoder. For example, with a 4×4 luma block, the current draft HEVC standard prescribes that each bit position in the 4×4 significance map has a unique context. Excluding the last position, that means 15 contexts are tracked for encoding of 4×4 luma significance maps. For each bit position, the context assigned to that position determines the estimated probability associated with an LPS in that position. The actual bit value is then encoded using that estimated probability. Finally, the context assigned to that position is updated based on the actual bit value. At the decoder, the encoded data is decoded using the same context model. A context for each bit position is tracked and used to determine the estimated probability for decoding data to recover bits for that position.

Context assignment may be considered as partitioning the block of data and mapping a distinct context to each part. Mathematically, the mapping may be defined using P: $\{0, \ldots, n-1\} \times \{0, \ldots, n-1\} \rightarrow \{0, \ldots, m-1\}$ as a partition set. The bit positions are indexed as $\{0, \ldots, n-1\} \times \{0, \ldots, n-1\}$. The numbers $0, \ldots, m-1$ identify different partitions. Each partition has one designated context associated with it. This context may be used exclusively for that partition (in some cases, a context may be used for both luma and chroma type blocks).

For any two partition sets P and Q, if there is a mapping T such that T(P(i,j))=Q(i,j) for all i and j, then we say that Q is a subset of P, or P is a refinement of Q.

Encoding works as follows: the TU of size n×n is assigned with a partition set P. The significance map may be considered a matrix M(i,j). The matrix M read in horizontal scanning order may be denoted M(0, 0), M(0, 1), ..., M(0, n−1), M(1, 0), M(1, 1), ..., M(1, n−1), ... M(n−1, n−1).

The scanning order defines a one-to-one mapping from the matrix representation to a vector representation. In vector form, the scanning order corresponds to a permutation of the numbers $0, 1, \ldots, n^2-2$. In practical implementations, indexing may based on single value vector indexing or matrix-style double indexing, whichever is more convenient. M(i,j) is encoded in the BAC context corresponding to P(i,j), and that context is updated using M(i,j). Decoding is derived from the encoding procedure in a straightforward way.

This framework may be used to describe the significance map coding scheme currently proposed for HEVC. Each of the 4×4 and 8×8 TUs is associated with a separate partition set, called P4 and P8, respectively. These are given as:

$P4(i,j)=4*i+j$ $i,j=0,1,2,3$ [15 contexts total]

$P8(i,j)=4*[i/2]+[j/2]$ $i,j=0,1,2,3,4,5,6,7$ [16 contexts total]

The same mappings are used for luma and chroma, but the contexts for luma and chroma are separate. Therefore, the total number of used contexts for these TUs is 15+15+16+16=62.

It will be noted that the partitioning of the significance maps is uniformly distributed. That is, there are just as many contexts assigned to bit positions of the lower right quadrant as there are assigned to the upper left quadrant. A uniform distribution of contexts may not be optimal for many embodiments. The contexts associated with the upper left quadrant are more heavily used than the contexts in the bottom right quadrant (since the significance maps often end before reaching these bottom right bit positions). Accordingly, there is less data available for these contexts, making them less quickly adaptive and, more generally, less effective.

As will be described below, improved partitioning and mapping will strike a better balance between objectives of accuracy (which tends towards fewer bit positions per context) and adaptivity (which tends towards more bit positions per context so as to provide more data and converge more quickly on an optimal probability estimate). A good partition set will balance between compression efficiency and the number of partitions m. When optimizing partition sets under these two constraints, in theory all possible instances of P for a given TU size should be evaluated.

To understand the complexity of this task, the number of essentially unique partition sets for any given TU size n×n and partition count m may be calculated. It will be noted that the matrix arrangement of the partitions is arbitrary, and an equivalent representation in vector form is available, using, for instance, a horizontal scan order. Denote the resulting mapping by $P_v$: $\{0, \ldots, N-1\} \rightarrow \{0, \ldots, m-1\}$, where $N=n^2-1$ (i.e. excludes the bottom right bit position). Let C(N, m) be the number of such surjective mappings, meaning that the range of $P_v$ is $\{0, \ldots, m-1\}$, omitting those mappings that are simple permutations of already counted mappings (that is, the partitions that can be relabeled to result in another, already counted mapping). Note that C(N, 1)=1 and C(N, N)=1 for any N≥1. For m>1 all the $P_v$ mappings may be separated into two classes. In the first class, let $P_v(0) \notin \{P_v(1), \ldots, P_v(N-1)\}$; since the values $1, \ldots, N-1$ are now mapped onto $\{1, \ldots, P_v(0)-1, P_v(0)+1, \ldots, m-1\}$, the number of such mappings is C(N−1, m−1). In the second class $P_v(0) \in \{P_v(1), \ldots, P_v(N-1)\}$; the values $1, \ldots, N-1$ are mapped onto $0, \ldots, m-1$, which can be done C(N−1, m) ways, and $P_v(0)$ can be inserted in any of the m partitions, resulting in m*C(N−1, m) possibilities. We have thus obtained the recurrence C(N, m)=C(N−1, m−1)+m*C(N−1, m). Note that thereby the C(N, m) numbers coincide with the Stirling numbers of the second kind.

Using this formula, it may be computed that the total number of partition sets for 4×4 TUs, that is, 15 coefficients or bit positions, is 1382958545; the number of partition sets having exactly 5 parts is 210766920, and those having exactly 10 parts are Ser. No. 12/662,650. The corresponding numbers for 8×8 TUs (63 coefficients) are better expressed in exponential form: the total number of different partition sets is $8.2507717*10^{63}$, the number of sets having no more than 16 parts is $3.5599620*10^{62}$, the number of sets having exactly 5 parts is $9.0349827*10^{41}$, and those having exactly 10 parts are $2.7197285*10^{56}$. Since any of these form legitimate partition sets for video compression, selecting the best ones from so many candidates is a significant and difficult task.

Example Partition Sets

Through empirical testing and analysis, the following example partition sets and context mappings appear to result in an advantageous balancing of computational speed and compression efficiency.

Figure 3:
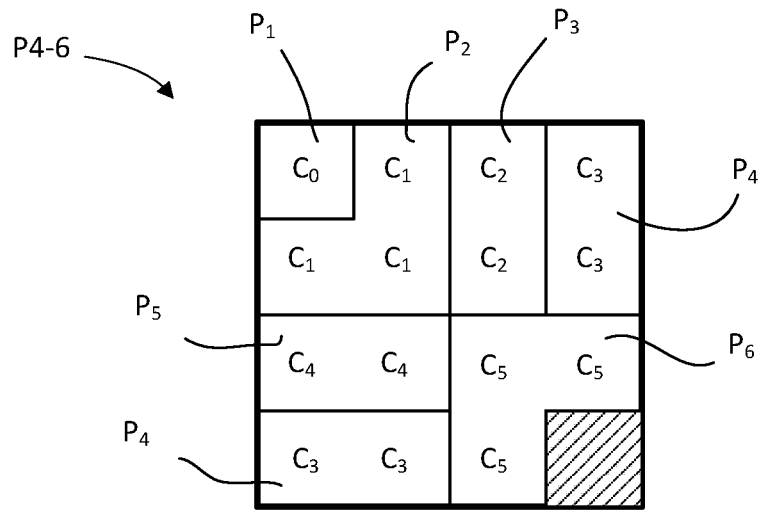
FIG. 3 diagrammatically illustrates a partitioning of a 4×4 block into six parts, wherein the bit positions in each part are mapped to a context.

Reference is now made to FIG. 3, which diagrammatically illustrates a partitioning of a 4×4 block into six parts, individually labeled $P_1, P_2, \ldots, P_6$. This may be used, for example, for significance maps in the case of 4×4 blocks. The context $(C_0, C_1, \ldots C_5)$ associated with each bit position is shown in the block 100. Bit positions within the same part all share the same context. It will be noted that part $P_4$ include two non-contiguous areas. The four bit positions in part $P_4$ are each assigned to context $C_3$. The partitioning shown in FIG. 3 may be denoted P4-6, to indicate that the partitioning relates to a 4×4 block and features 6 parts.

Figure 4:
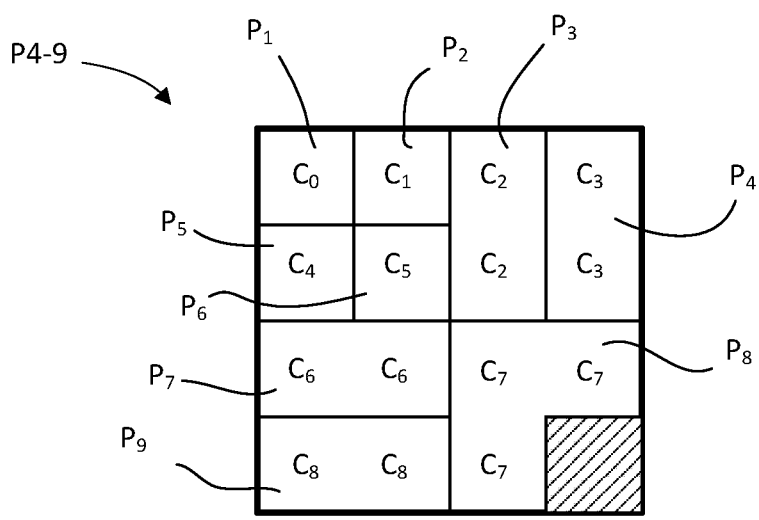
FIG. 4 shows a refinement of the partitioning in FIG. 3, resulting in nine parts.

FIG. 4 diagrammatically shows a refinement of P4-6, in which further partitioning divides part $P_2$ into three individual parts; those individual parts are labeled $P_2, P_5$ and $P_6$. It will also be noted that part $P_4$ has been divided in half such that the two non-contiguous areas are now separate parts, labeled $P_4$ and $P_9$ in this example illustration. This partitioning structure may be denoted P4-9 to signify that it assigns 9 contexts to the 9 distinct parts of the 4×4 block.

Figure 5:
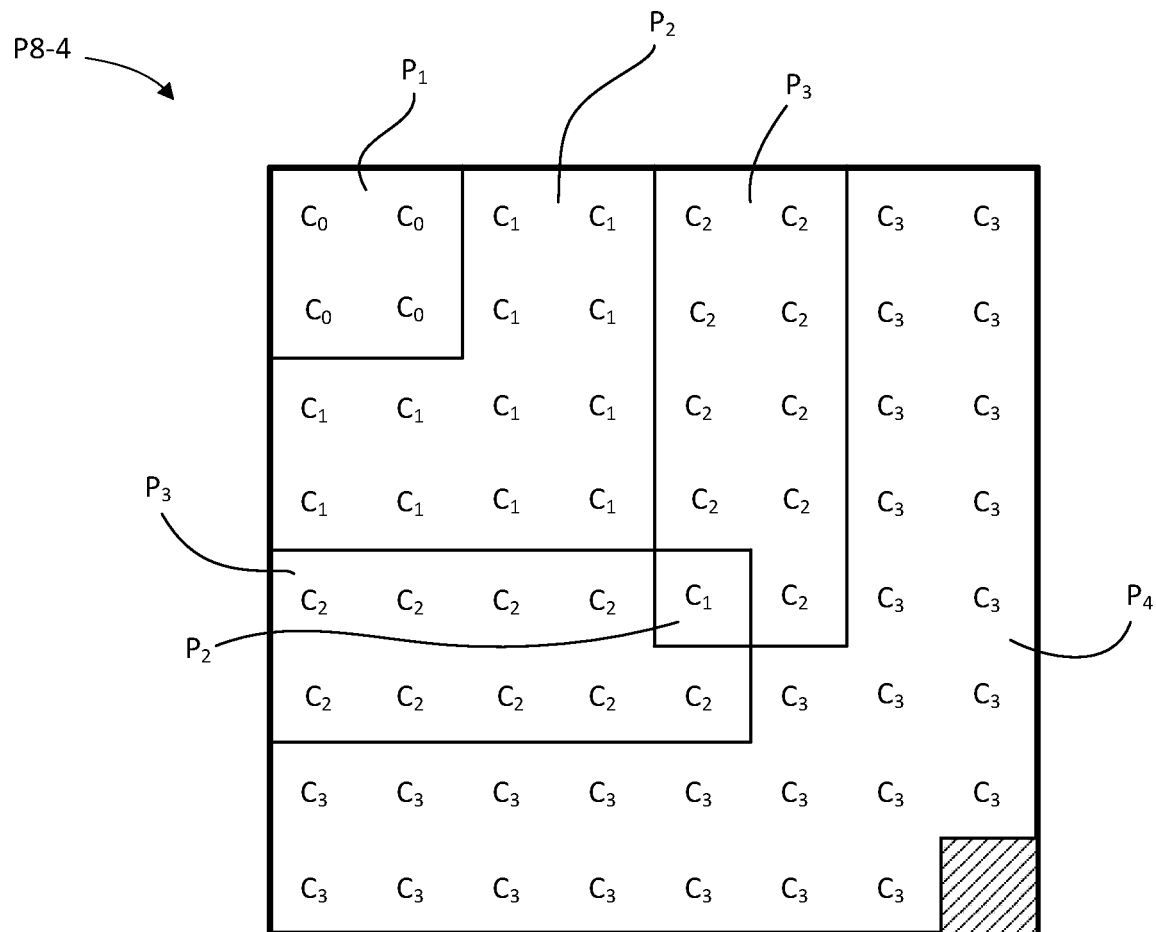
FIG. 5 diagrammatically illustrates a partitioning of a 8×8 block into four parts, wherein the bit positions in each part are mapped to a context.

FIG. 5 illustrates a partitioning of an 8×8 block into 4 separate parts, labeled $P_L$ to $P_4$. A respective one of the contexts $C_0$ to $C_3$ are assigned to each of the parts, as shown. This partitioning may be denoted P8-4.

Figure 6:
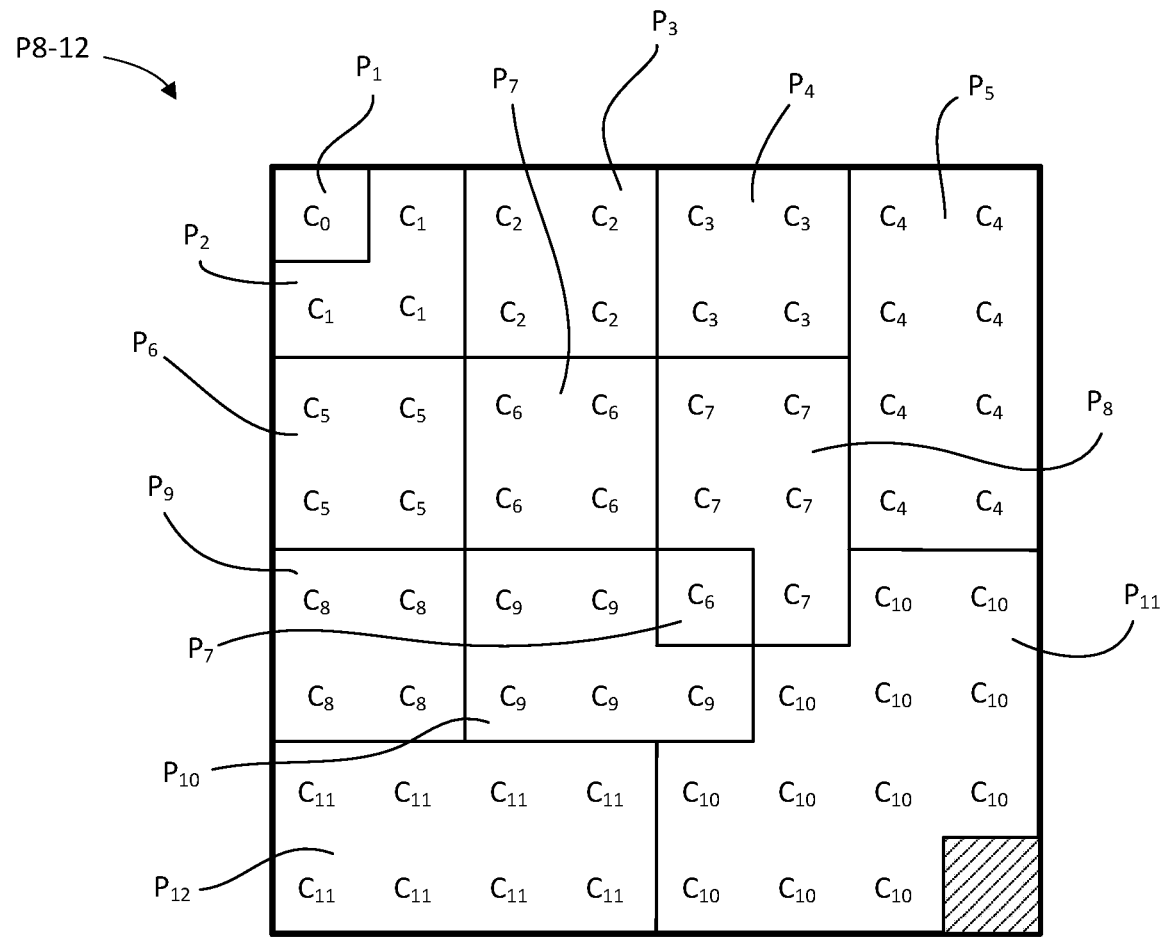
FIG. 6 shows a refinement of the partitioning in FIG. 5, resulting in twelve parts.

FIG. 6 illustrates a refinement of P8-4 as P8-12. In this case, the partitioning of P8-4 is further subdivided such that the four parts are subdivided to a total of 12 parts, as illustrated in the diagram. Thus, there are 12 contexts $C_0, \ldots, C_{11}$ in this partitioning.

In all the foregoing examples, it will be noted that the partitioning, and thus the allocation/assignment of contexts, is not uniformly distributed through the block. That is, the smaller parts in the partitioning tend to be clustered towards the upper left quadrant and the larger parts in the partitioning tend to located towards the bottom and right side of the block. As a result, the contexts assigned to the upper left quadrant tend to have fewer bit positions associated with them (in general, but not always), and the context(s) assigned to the bottom or right side tend to have more bit positions associated with them. Over time, this will tend to result in a more uniform use of the contexts. That is, this non-uniform spatial allocation tends towards a more uniform allocation of bits to each context.

It will also be noted that the P4-6 partitioning is a subset of the P4-9 partitioning, and the P8-4 partitioning is a subset of the P8-12 partitioning. This characteristic has relevance to some partition set selection processes, as will be explained below.

In one application, the context index derivation for the 4×4 and 8×8 partition sets may be obtained by a table look up. In another application, the context index can be determined by logical operations. For example, for the P4-6 set the context index derivation could be obtained as:

(x&2)?((y&2)? 5: x):
((y&2)?(y&1?3:4):
(x|y));

It will be appreciated that the four example partition sets described above are examples. Other (or additional) partition sets may be used in the selection processes described below.

Partition Set Selection—Static Assignment

The present application details four example selection processes. The first example selection process is static assignment. In this example process, the encoder and decoder are preconfigured to use a particular partition set for significance maps having particular characteristics. For example, the assignment may be based upon TU size, text type (luma or chroma), and/or upon QP value. This assignment may be specified by the encoder in a header preceding the video data, or may be preconfigured within both the encoder and decoder.

In some implementations, the assignment may be (partly) based upon chroma subsampling. For 4:2:0 and 4:1:1 subsampling, the chroma components contain considerably less information than the luma component, which suggests using more coarse partition sets for chroma than for luma. For example, P4-9 may be used for 4×4 luma, P4-6 for 4×4 chroma, P8-12 for 8×8 luma, and P8-4 for 8×8 chroma. This would result in 31 contexts.

For the 4:4:4 subsampling case, the chroma values have comparatively elevated importance, which motivates use of a more refined partition set for chroma. Accordingly, in one example P4-9 may be used for both 4×4 luma and chroma, and P8-12 for 8×8 luma and chroma. This would result in 42 contexts.

Note, however, that in some implementations contexts may be shared between text types. For example, 4×4 luma and 4×4 chroma may both use a P4-9 partition set, but the contexts in that set are uses for both luma and chroma. In another embodiment, both 4×4 luma and 4×4 chroma may use a P4-9 partition set, but they may use separate contexts.

Figure 7:
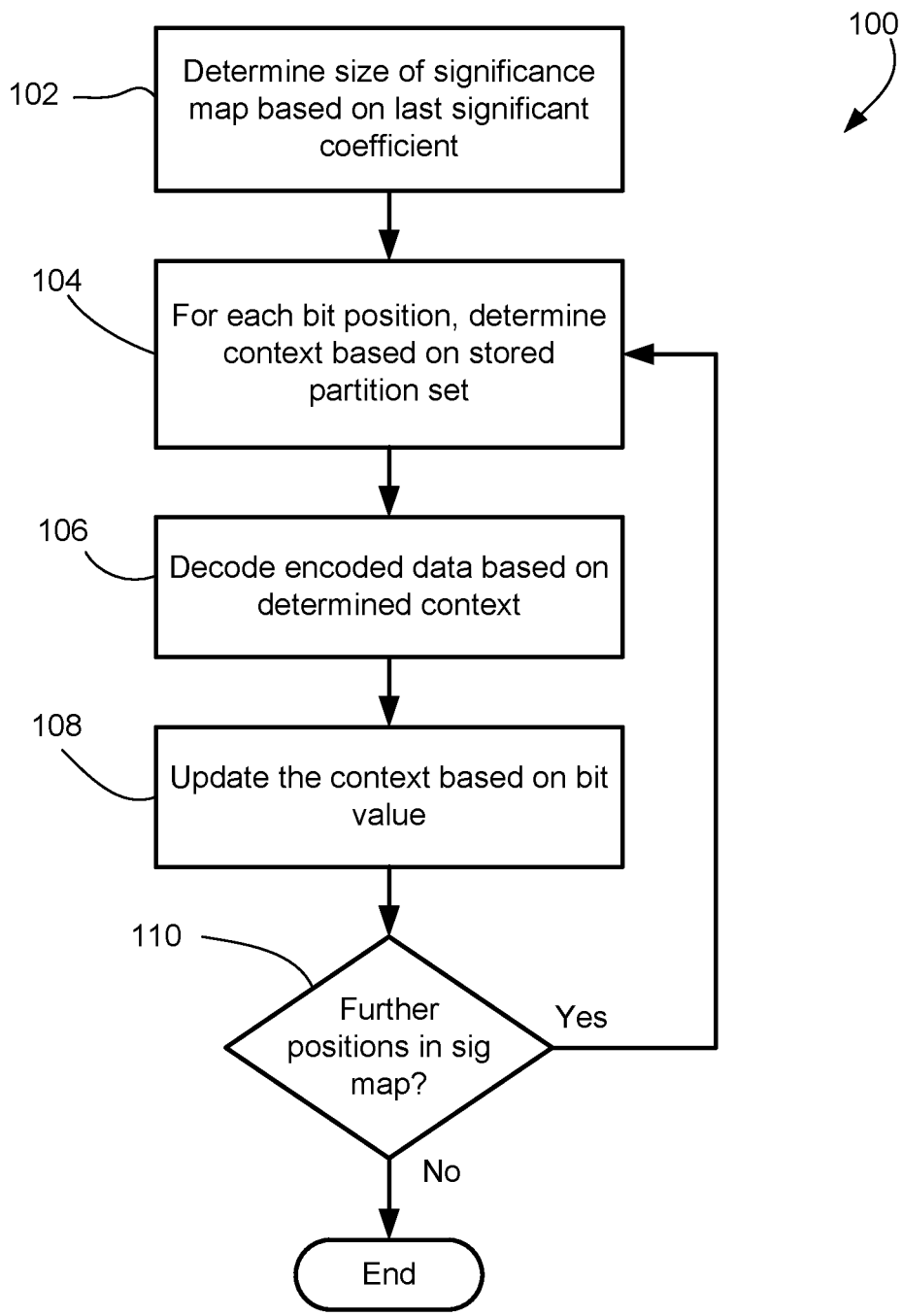
FIG. 7 shows, in flowchart form, an example method for decoding encoded data to reconstruct a significance map.

Reference is now made to FIG. 7, which shows, in flowchart form, an example method 100 for decoding a bitstream of encoded data to reconstruct a significance map. The method 100 begins with determining the size of the significance map in operation 102. This determination is based upon the last significant coefficient, which is specified in the bitstream. The last significant coefficient may, in some embodiments, be signaled in binary using a string of zeros for all bit positions (in the scan order) prior to the last significant coefficient and a one at the bit position of the last significant coefficient. It may alternatively be signaled using a pair of indices (x, y) indicating the bit position. In another embodiment it may be signaled using a single index indicating the bit position in the scan order. Other mechanisms of signaling the last significant coefficient may also be used. In any event, the last significant coefficient informs the decoder of the size of the significance map.

Operations 104, 106 and 108 are performed for each bit position in the significance map in the same order in which the encoder would have encoded them. In some embodiments, this may mean in the scan order. In some embodiments, this may be mean in reverse scan order. Provided the encoder and decoder use the same order, it may be any arbitrary order.

In operation 104, the context for the current bit position is determined from a stored partition set. In the case of this example method, the static assignment of a partition set may be used. Accordingly, the text type and transform unit size determined the stored partition set that specifies the assigned context for that bit position. As an example, the stored partition sets may be the P4-6, P4-9, P8-4, and P8-12 partition sets described herein.

In operation 106, the encoded data is decoded to reconstruct a bit value for that bit position based on the determined context. For example, the context may provide an estimated probability of an LPS, from which the CABAC engine produces a bit value from the encoded data. In operation 108, the determined context is then updated based upon the bit value.

In operation 110, the decoder assesses whether further bit positions remain in the significance map and, if so, repeats operations 104, 106, and 108 for the next bit position.

Partition Set Selection—Sequence Specific Assignment

The second example selection process is sequence specific assignment. In this example process, the encoder determines which partition set to use for particular categories of TUs based on, for example, TU size, text type, QP value, or other characteristics. This determination applies to the entire video sequence. The selected partition sets are specified in the sequence header. Accordingly, the decoder reads the sequence header and thereafter knows which partition sets to use for decoding significance maps in particular circumstances. If the same partition set is used with more than one text type (e.g. for both 4×4 luma and 4×4 chroma), then the encoder may also specify whether the contexts are shared or whether the two text types use separate contexts.

In one example syntax, the encoder may list an identifier for each partition set to be used, where the same partition set can be listed more than once if its partition structure applies in more than one situation and if the contexts for the more than one situation are to be distinct. The encoder then assigns one of the listed partition sets to each "category" of significance map (e.g. 4×4 luma, 4×4 chroma, 8×8 luma, 8×8 chroma, etc.) in a predetermined order. In some embodiments, QP value may also be a factor in determining the "categories" of significance maps.

To illustrate this example syntax, consider four partition sets, such as the P4-6, P4-9, P8-4, and P8-12 examples given above. The four sets may be indexed using four bits, such as 00, 01, 10, 11, corresponding to P4-6, P4-9, P8-4, and P8-12, respectively.

If the encoder determines that P4-9 should be used for both 4×4 luma and 4×4 chroma with separate contexts, and that P8-12 should be used for both 8×8 luma and 8×8 chroma but with shared contexts, then the encoder generates a sequence header that includes the binary indicator: 01011100011010.

The decoder, upon reading this indicator from the sequence header, will recognize that the sets P4-9 (01), P4-9 (01), and P8-12 (11) are going to be used. The decoder will also recognize that having listed them in this manner, they are now going to be referred to as "00" for the first P4-9 set, "01" for the second P4-9 set, and "10" for the P8-12 set.

The decoder then reads "00011010", in which each two bit portion specifies the partition set to be used for each of 4×4 luma, 4×4 chroma, 8×8 luma, and 8×8 chroma. The bits index the partition set by its order in the list read just previously. Accordingly, the decoder reads 00 and knows that this refers to the first P4-9 set. It then reads 01, which refers to the second P4-9 set. The last four bits, "10" and "10", tell the decoder that the same P8-12 set is to be used for both 8×8 luma and 8×8 chroma, with shared contexts.

It will be understood that other syntax may be used to signal partition set selection in the sequence header, and the foregoing is but one example implementation.

The encoder may select the partition sets using a table, a constant function, or other mechanism. The function and/or table may take into account TU size, text type (luma or chroma), QP value, number of pixels in the slice/sequence, or other factors.

Partition Set Selection—Slice-Specific Assignment

The third example selection process is slice-specific assignment.

It has been noted that the balance between adaptivity and accuracy tilts towards coarse partitions when the encoded slice size is relatively small, and tilts towards fine partitions when the encoded slice size is relatively large. Accordingly, the number of bits to be encoded, or more particularly, the number of encoded bits that result from the encoding process, may be a significant factor in determining the most suitable partition set.

Figure 8:
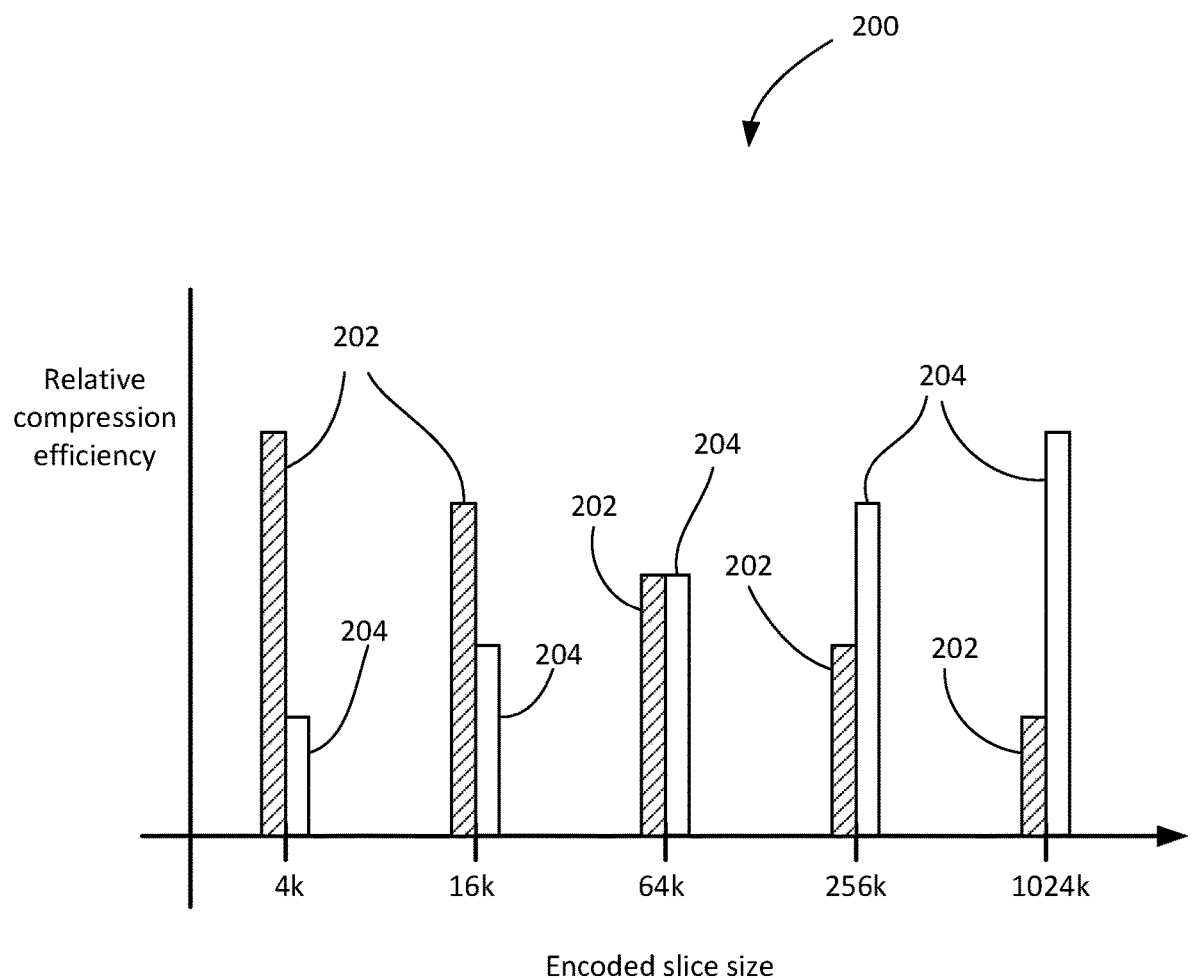
FIG. 8 shows a chart illustrating the relative efficacy of coarse and fine partitions and its dependence on encoded slice size.

Reference is now made to FIG. 8, which shows an example graph 200 of the relative efficacy of coarse partitioning versus fine partitioning for various encoded slice sizes. Each encoded slice size along the horizontal axis shows two columns, one for a coarse partition set 202, and one for a fine partition set 204. The column height is based on the number of times that the given partition set results in better compression efficiency than the alternative set for a test slice, divided by the total number of test slices. It will be noted that the coarse partition set 202 outperforms the fine partition set 204 for small size slices, and that the fine partition set 204 outperforms the coarse partition set 202 for larger size slices.

Accordingly, one or more threshold values may be set for switching from a more coarse partition set to the next more fine partition set. With the example sets described above, there are only two partition sets (one coarse, one fine) for each TU size, so the threshold may be set at or around 64 k, for example. In the case where more partition sets are predefined for a given TU size additional or other threshold values may be established.

In the slice-specific assignment process, the encoder selects a partition set for the TUs of each slice. The selection may be communicated to the decoder in the slice header. A syntax such as that outlined above may be used to communicate the selected partition sets for particular categories of TUs. In this manner the encoder may tailor the selection of partition sets to the characteristics of a particular slice. However, to do so, the encoder would need to encode the slice using a default partition selection, analyze the slice characteristics (like encoded slice size), and then re-encode with a new partition selection (if it differs from the default. In some implementations, this extra computational burden on the encoder may be acceptable, such as where the encoding occurs once (i.e. in encoding a video for storage on distribution media such as DVD/Blu-Ray) and non-real-time playback occurs later, possibly multiple times. In other implementations, like video conferencing or handheld video recording, the two-pass encoding burden on the encoder may be unacceptable.

One option is to base the partition set selection on the statistics of the previously encoded slice that has the same QP value and slice type (intra or inter). If such a previous slice exists for the video, then the encoder may assign partition sets to TUs based on the statistics (e.g. encoded size) of the previous similar slice. If a previous slice does not exist, then the encoder may use default partition set selections.

Partition Set Selection—Dynamic Assignment

The fourth example selection process uses a sequence of partition sets for each TU, wherein each successive partition set in the sequence is a more refined version of its predecessor. Each TU starts with the first partition set on its list, then at each LCU boundary it checks whether the encoded size so far has exceeded a certain limit. When that happens, the next partition set from that list is assigned to the TU. The decision about when to switch is based on the current slice, hence it can be determined by the decoder the same way as was done by the encoder, and no further information needs to be specified in the video sequence.

In this example process, switching from one partition set Q to another set P makes use of the fact that Q is a subset of P. The BAC context associated with each part $P(i, j)$ is initialized to $T(P(i,j))$ from Q; and the subset property asserts that this initialization is well-defined. If for two bit positions $(i_1, j_1)$ and $(i_2, j_2)$, $P(i_1, j_1)$ t $P(i_2, j_2)$ but $T(P(i_1, j_1))=T(P(i_2, j_2))$, then the parts of $(i_1, j_1)$ and $(i_2, j_2)$ are initialized to the same BAC state, but from that point on the two contexts corresponding to these two partitions work independently, and may diverge.

To give an example, suppose partitions P4-6 and P4-9 are both used for the encoding of 4×4 luma significance maps, and partitions P8-4 and P8-12 are both used for the encoding of 8×8 luma significance maps. Assume that the chroma partitions are fixed in this case. Note that P4-9 is a refinement of P4-6, and P8-12 is a refinement of P8-4. The switching criterion is two threshold values, one for 4×4 and another for 8×8, of the number of bins that the binary arithmetic coder has encoded so far in the current slice. The partition P4-6 is initialized and used for the luma 4×4 significance map and partition P8-4 is initialized and used for the luma 8×8 significance map, respectively. After having coded each LCU, the number of bins the BAC has encoded is checked and compared with the 4×4 threshold and the 8×8 threshold. If the 4×4 threshold is exceeded, the partition set P4-9 is used for the luma 4×4 significance map, and similarly, if the 8×8 threshold is exceeded, the partition P8-12 is used for the luma 8×8 significance map, for all the following LCUs. The initialization values of the P4-9 partitions (defined as C4-9[i] as shown below) would be copied from the values of the P4-6 (defined as C4-6[i] as shown below) as follows:

C4-9: {C4-6[0], C4-6[1], C4-6[2], C4-6[3], C4-6[1], C4-6[1], C4-6[4], C4-6[5], C4-6[3]}

The initialization value of the P8-12 partitions (defined as C8-12[i] as shown below) would be copied from the values of the P8-4 (defined as C8-4[i] as shown below) as follows C8-12: [C8-4[0], C8-4[0], C8-4[1], C8-4[2], C8-4[3], C8-4[1], C8-4[1], C8-4[2], C8-4[2], C8-4[2], C8-4[3], C8-4[3]}

From the next LCU on, each partition/context in P4-9 and P8-12 operates and updates independently of any other contexts.

Since the decoder could count the number of bins decoded the same way, the above process could be repeated at the decoder side, without explicit signalling from the encoded slice header.

Partition Initialization

Since each part within a partition set corresponds to a BAC state, which is used for encoding and decoding the bits in that partition, at the beginning of each slice the initial value of that state needs to be determined. The initial value is a BAC state, which in current HEVC terminology is an integer value in the interval {1, . . . , 126}. The least significant bit of this value specifies the MPS, and the remaining 6 bits identify the probability of the LPS. The uniform state with MPS=1 and p(LPS)=0.5 is identified by the value 64.

The partition sets described above have been chosen such that the state initialization may be dispensed in some embodiments without significant loss in compression performance. Therefore, whenever a partition needs to be initialized, it may be set to the uniform state.

In another embodiment, initialization values may be provided. In one implementation, the initialization values provided are for inter slices. However, rather than specifying a linear function of QP for each part, slice type (I, P, B) and text type (luma, chroma), in one embodiment, the present application proposes a single value for each partition.

As an example, the following initialization values may be used for the partitions described above. Note that for visual clarity these are shown in matrix notation, in which the initialization value of the context is shown for every position where the context is used in that partition set; however, in practical implementations a vector notation, in which the initialization value is shown for each context (in a known order) rather than each bit position may be more compact.

Intra init values for P4-9:

[ 77 71 66 61
  71 67 66 61
  66 66 65 65
  61 61 65       ],

Intra init values for P4-6:

[ 67 60 55 46
  60 60 55 46
  55 55 54 54
  46 46 54       ],

Intra init values for P8-12:

[ 71 67 59 59 53 53 45 45
  67 67 59 59 53 53 45 45
  59 59 55 55 51 51 45 45
  59 59 55 55 51 51 45 45
  53 53 51 51 55 51 42 42
  53 53 51 51 51 42 42 42
  45 45 45 45 42 42 42 42
  45 45 45 45 42 42 42     ],

Intra init values for P8-4:

[ 62 62 48 48 41 41 33 33
  62 62 48 48 41 41 33 33
  48 48 48 48 41 41 33 33
  48 48 48 48 41 41 33 33
  41 41 41 41 48 41 33 33
  41 41 41 41 41 33 33 33
  33 33 33 33 33 33 33 33
  33 33 33 33 33 33 33     ],

Inter (B) init values for P4-9:

[ 61 56 52 51
  56 54 52 51
  52 52 55 55
  51 51 55       ],

Inter (B) init values for P4-6:

[ 60 49 43 36
  49 49 43 36
  43 43 48 48
  36 36 48       ],

Inter (B) init values for P8-12:

[ 59 52 45 45 38 38 37 37
  52 52 45 45 38 38 37 37
  45 45 40 40 37 37 37 37
  45 45 40 40 37 37 37 37
  38 38 37 37 40 37 40 40
  38 38 37 37 37 40 40 40
  37 37 37 37 40 40 40 40
  37 37 37 37 40 40 40 40 ],

Inter (B) init values for P8-4:

[ 56 56 37 37 27 27 25 25
  56 56 37 37 27 27 25 25
  37 37 37 37 27 27 25 25
  37 37 37 37 27 27 25 25
  27 27 27 27 37 27 25 25
  27 27 27 27 27 25 25 25
  25 25 25 25 25 25 25 25
  25 25 25 25 25 25 25 25 ],

Inter (P) init values for P4-9:

[ 62 57 54 51
  57 55 54 51
  54 54 55 55
  51 51 55 55 ],

Inter (P) init values for P4-6:

[ 61 51 43 34
  51 51 43 34
  43 43 48 48
  34 34 48 48 ],

Inter (P) init values for P8-12:

[ 60 54 47 47 42 42 39 39
  54 54 47 47 42 42 39 39
  47 47 43 43 41 41 39 39
  47 47 43 43 41 41 39 39
  42 42 41 41 43 41 41 41
  42 42 41 41 41 41 41 41
  39 39 39 39 41 41 41 41
  39 39 39 39 41 41 41 41 ],

Inter (P) init values for P8-4:

[ 55 55 37 37 27 27 21 21
  55 55 37 37 27 27 21 21
  37 37 37 37 27 27 21 21
  37 37 37 37 27 27 21 21
  27 27 27 27 37 27 21 21
  27 27 27 27 27 21 21 21
  21 21 21 21 21 21 21 21
  21 21 21 21 21 21 21 21 ].

Scan Order

As explained above, the location of the last significant coefficient (LSC) is determined using scan order. Example defined scan orders include horizontal, vertical, diagonal, and zig-zag. The encoding and decoding of the significance map proceeds in the reverse specified scan order, backward from the LSC.

In some implementations, for example, those done in hardware, it may be advantageous to minimize the number of times the encoder or decoder must load a new context. Since each position in a given part of the partition set use the same context, this means that processing all positions in one part before proceeding to the next part may be more efficient. Accordingly, in some embodiments a different scan order may be used for encoding the significance map than was used for determining the LSC.

In an n×n TU, the coding scan order is an arbitrary permutation of the numbers 0, 1, . . . , $n^2-2$. The permutation is applied to the matrix positions listed in horizontal scan order. Any permutation may be used, so long as the encoder and decoder agree on the same permutation for each partition set. The permutation may be designed, for example, so that it would minimize the number of switches between contexts.

To use an example, recall that the partition set for P4-6 is given by:

| 0 | 1 | 2 | 3 |
|---|---|---|---|
| 1 | 1 | 2 | 3 |
| 4 | 4 | 5 | 5 |
| 3 | 3 | 5 |   |

If we use diagonal scanning, then the permutation is given by $$0,4,1,8,5,2,12,9,6,3,13,10,7,14,11 \quad (1)$$

where the numbers 0, 1, . . . 14 refer to the 4×4 bit positions in horizontal order. In this diagonal scanning permutation, the context are thus used in the following order:

$$0,1,1,4,1,2,3,4,2,3,3,5,3,5,5 \quad (2)$$

For the encoding and decoding of the significance map, these contexts are used in an order read backward from the position before the LSC. This results in more context changes than the following scan order, or permutation:

$$0,4,1,5,2,6,3,7,12,13,8,9,10,11,14 \quad (3)$$

which results in the contexts being used in the following order:

$$0,1,1,1,2,2,3,3,3,3,4,4,5,5,5 \quad (4)$$

Accordingly, scan order (3) may be predefined for use with P4-6 instead of the diagonal scan (1) when processing the significance map, which results in the context sequence (4) instead of (2), resulting in fewer context changes between coefficients.

The reordered scan order for the significance map to minimize context changes may be advantageous in some hardware implementations. While it is possible to process bits from two different contexts in a single clock cycle, it is easier to implement processing of bits from the same context in a single clock cycle. By reordering the bins to group them by context, it is easier to process multiple bins per clock cycle. If the two contexts being dealt with in a single clock cycle are different, then the encoder/decoder must read two different contexts and update two different contexts. It may be easier to produce a hardware implementation that updates a single context twice in one clock cycle than to read and update two.

Detailed Syntax Example—Static Assignment Embodiment

Building on the syntax currently under development in HEVC, the following modifications and/or additions to the syntax may be made in some example embodiments to facilitate use of static assignment. In the following examples, the syntax is based on an implementation in which the four example partitions sets described above, P4-6, P4-9, P8-4, and P8-12, are stored and assigned, respectively, for use with 4×4 chroma, 4×4 luma, 8×8 chroma, and 8×8 luma.

Inputs to this process are the color component index cIdx, the current coefficient scan position (xC, yC), i.e. bit position, and the transform block size log 2TrafoSize. Output of this process is ctxIdxInc. The variable sigCtx depends on the current position (xC, yC), the color component index cIdx, the transform block size and previously decoded bins of the syntax element significant_coeff_flag. For the derivation of sigCtx, the following process applies:

If log 2TrafoSize equals to 2, sigCtx is derived as follows:

sigCtx=CTX_IND_MAP_4×4[cIdx][(yC<<2)+xC]

Otherwise if log 2TrafoSize equals to 3, sigCtx is derived as follows:

sigCtx=CTX_IND_MAP_8×8[cIdx][(yC<<3)+xC]

The constants CTX_IND_MAP_4×4 and CTX_IND_MAP_8×8 may be defined for luma and chroma as follows:

```
static const UInt CTX_IND_MAP4×4[2][15] =
{
  //LUMA map
  {
    0, 1, 2, 3,
    4, 5, 2, 3,
    6, 6, 7, 7,
    8, 8, 7,
  },
  //CHROMA map
  {
    0, 1, 2, 3,
    1, 1, 2, 3,
    4, 4, 5, 5,
    3, 3, 5
  }
};
static const UInt CTX_IND_MAP8×8[2][63] =
{
  //LUMA map
  {
    0, 1, 2, 2, 3, 3, 4, 4,
    1, 1, 2, 2, 3, 3, 4, 4,
    5, 5, 6, 6, 7, 7, 4, 4,
    5, 5, 6, 6, 7, 7, 4, 4,
    8, 8, 9, 9, 6, 7, 10, 10,
    8, 8, 9, 9, 9, 10, 10, 10,
    11, 11, 11, 11, 10, 10, 10, 10,
    11, 11, 11, 11, 10, 10, 10
  },
  //CHROMA map
  {
    0, 0, 1, 1, 2, 2, 3, 3,
    0, 0, 1, 1, 2, 2, 3, 3,
    1, 1, 1, 1, 2, 2, 3, 3,
    1, 1, 1, 1, 2, 2, 3, 3,
    2, 2, 2, 1, 2, 3, 3, 3,
    2, 2, 2, 2, 2, 3, 3, 3,
    3, 3, 3, 3, 3, 3, 3, 3,
    3, 3, 3, 3, 3, 3, 3
  }
};
```

The context index increment ctxIdxInc is derived using the color component index cIdx, the transform block size log 2TrafoSize, sigCtx and the partition sets, as follows.

The values for ctxOffset[max(log 2TrafoSize−2, 2)][cIdx] are defined in the following table:

| max(log2TrafoSize−2, 2) | cIdx = 0 | cIdx = 1 |
|---|---|---|
| 0 | 0 | 0 |
| 1 | num_partitions_luma4 × 4 | num_partitions_chroma4 × 4 |
| 2 | num_partitions_luma4 × 4 + num_partitions_luma8 × 8 | num_partitions_chroma4 × 4 + num_partitions_chroma8 × 8 |

For example, if the partition set P4-9 is used for luma 4×4 blocks, P4-6 for chroma 4×4 blocks, P8-12 for luma 8×8 blocks, and P8-4 for chroma 8×8 blocks, the table above takes the following values:

| max(log2TrafoSize−2, 2) | cIdx = 0 | cIdx = 1 |
|---|---|---|
| 0 | 0 | 0 |
| 1 | 9 | 6 |
| 2 | 21 | 10 |

It is noted that ctxIdxInc refers to the starting position of the 4×4 block of the component cIdx. The value ctxIdxInc is derived as:

ctxIdxInc=ctxOffset[max(log 2TrafoSize−2,2)][cIdx]+sigCtx

In terms of initialization of the context variables, the association between ctxIdx and syntax elements for each slice type may be specified by:

| | | | Slice Type | | |
|---|---|---|---|---|---|
| | Syntax element | ctxIdxTable | I | P | B |
| residual_coding( ) | last_significant_coeff_x | ... | ... | ... | ... |
| | last_significant_coeff_y | ... | ... | ... | ... |
| | significant_coeff_flag | Table | 0..56 | 0..56 | 0..56 |
| | coeff_abs_level_greater1_flag | ... | ... | ... | ... |
| | coeff_abs_level_greater2_flag | ... | ... | ... | ... |

Assuming a uniform initialization embodiment, the ctxIdxTable referred to above for syntax element significant_coeff_flag may be given by:

| Initialisation variables | significant coeff flag ctxIdx | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| m | 0 | 0 | 0 | 0 | 0 | 0 | 0 | 0 | 0 | 0 | 0 | 0 | 0 | 0 | 0 | 0 |
| n | 64 | 64 | 64 | 64 | 64 | 64 | 64 | 64 | 64 | 64 | 64 | 64 | 64 | 64 | 64 | 64 |
| | 16 | 17 | 18 | 19 | 20 | 21 | 22 | 23 | 24 | 25 | 26 | 27 | 28 | 29 | 30 | 31 |
| m | 0 | 0 | 0 | 0 | 0 | 0 | 0 | 0 | 0 | 0 | 0 | 0 | 0 | 0 | 0 | 0 |
| n | 64 | 64 | 64 | 64 | 64 | 64 | 64 | 64 | 64 | 64 | 64 | 64 | 64 | 64 | 64 | 64 |
| | 32 | 33 | 34 | 35 | 36 | 37 | 38 | 39 | 40 | 41 | 42 | 43 | 44 | 45 | 46 | 47 |
| m | 0 | 0 | 0 | 0 | 0 | 0 | 0 | 0 | 0 | 0 | 0 | 0 | 0 | 0 | 0 | 0 |
| n | 64 | 64 | 64 | 64 | 64 | 64 | 64 | 64 | 64 | 64 | 64 | 64 | 64 | 64 | 64 | 64 |
| | 48 | 49 | 50 | 51 | 52 | 53 | 54 | 55 | 56 | | | | | | | |
| m | 0 | 0 | 0 | 0 | 0 | 0 | 0 | 0 | 0 | | | | | | | |
| n | 64 | 64 | 64 | 64 | 64 | 64 | 64 | 64 | 64 | | | | | | | |

However, if a constant initialization is implemented instead of a uniform initialization, then the association between the syntax element and ctxIdx may be modified as shown below:

| | Syntax element | ctxIdxTable | Slice Type | | |
|---|---|---|---|---|---|
| | | | I | P | B |
| residual_coding( ) | last_significant_coeff_x | ... | ... | ... | ... |
| | last_significant_coeff_y | ... | ... | ... | ... |
| | significant_coeff_flag_(I) | Table I | 0..56 | | |
| | significant_coeff_flag_(B) | Table B | | 0..56 | |
| | significant_coeff_flag_(P) | Table P | | | 0..56 |
| | coeff_abs_level_greater1_flag | ... | ... | ... | ... |
| | coeff_abs_level_greater2_flag | ... | ... | ... | ... |

The ctxIdxTable Table I referred to above for syntax element significant_coeff_flag (I) may then be given by:

| Initialisation variables | significant coeff flag ctxIdx | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| m | 0 | 0 | 0 | 0 | 0 | 0 | 0 | 0 | 0 | 0 | 0 | 0 | 0 | 0 | 0 | 0 |
| n | 77 | 71 | 66 | 61 | 71 | 67 | 66 | 65 | 61 | 71 | 67 | 59 | 53 | 45 | 59 | 55 |
| | 16 | 17 | 18 | 19 | 20 | 21 | 22 | 23 | 24 | 25 | 26 | 27 | 28 | 29 | 30 | 31 |
| m | 0 | 0 | 0 | 0 | 0 | −15 | −14 | −15 | −4 | 0 | −2 | −7 | −15 | −4 | 1 | −4 |
| n | 51 | 53 | 51 | 42 | 45 | 119 | 104 | 106 | 49 | 62 | 72 | 88 | 112 | 28 | 54 | 72 |
| | 32 | 33 | 34 | 35 | 36 | 37 | 38 | 39 | 40 | 41 | 42 | 43 | 44 | 45 | 46 | 47 |
| m | −7 | −10 | 0 | 0 | 0 | 0 | 0 | 0 | 0 | 0 | 0 | 0 | 15 | 7 | 5 | 14 |
| n | 82 | 96 | 67 | 60 | 55 | 46 | 55 | 54 | 62 | 48 | 41 | 33 | 59 | 56 | 57 | 11 |
| | 48 | 49 | 50 | 51 | 52 | 53 | 54 | 55 | 56 | | | | | | | |
| m | 10 | 7 | 5 | 11 | −9 | 5 | 7 | 10 | 13 | | | | | | | |
| n | 45 | 53 | 61 | 59 | 38 | 46 | 49 | 48 | 47 | | | | | | | |

The ctxIdxTable Table B referred to above for syntax element significant_coeff_flag (B) may then be given by:

| Initialisation variables | significant coeff flag ctxIdx | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| m | 0 | 0 | 0 | 0 | 0 | 0 | 0 | 0 | 0 | 0 | 0 | 0 | 0 | 0 | 0 | 0 |
| n | 61 | 56 | 52 | 51 | 56 | 54 | 52 | 55 | 51 | 59 | 52 | 45 | 38 | 37 | 45 | 40 |
| | 16 | 17 | 18 | 19 | 20 | 21 | 22 | 23 | 24 | 25 | 26 | 27 | 28 | 29 | 30 | 31 |
| m | 0 | 0 | 0 | 0 | 0 | 0 | 0 | −3 | 2 | 3 | 0 | −3 | −9 | −4 | 4 | 1 |
| n | 37 | 38 | 37 | 40 | 37 | 78 | 66 | 68 | 31 | 53 | 65 | 74 | 93 | 20 | 44 | 57 |
| | 32 | 33 | 34 | 35 | 36 | 37 | 38 | 39 | 40 | 41 | 42 | 43 | 44 | 45 | 46 | 47 |
| m | 0 | −1 | 0 | 0 | 0 | 0 | 0 | 0 | 0 | 0 | 0 | 0 | 28 | 16 | 11 | 26 |
| n | 65 | 72 | 60 | 49 | 43 | 36 | 43 | 48 | 56 | 37 | 27 | 25 | 29 | 35 | 39 | −18 |
| | 48 | 49 | 50 | 51 | 52 | 53 | 54 | 55 | 56 | | | | | | | |
| m | 10 | 4 | −2 | −11 | 0 | 5 | 5 | 9 | 20 | | | | | | | |
| n | 44 | 58 | 71 | 94 | 0 | 45 | 49 | 45 | 32 | | | | | | | |

The ctxIdxTable Table P referred to above for syntax element significant_coeff_flag (P) may then be given by:

| Initialisation variables | significant coeff flag ctxIdx | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| m | 0 | 0 | 0 | 0 | 0 | 0 | 0 | 0 | 0 | 0 | 0 | 0 | 0 | 0 | 0 | 0 |
| n | 62 | 57 | 54 | 51 | 57 | 55 | 54 | 55 | 51 | 60 | 54 | 47 | 42 | 39 | 47 | 43 |
| | 16 | 17 | 18 | 19 | 20 | 21 | 22 | 23 | 24 | 25 | 26 | 27 | 28 | 29 | 30 | 31 |
| m | 0 | 0 | 0 | 0 | 0 | 0 | 0 | −3 | 2 | 3 | 0 | −3 | −9 | −4 | 4 | 1 |
| n | 41 | 42 | 41 | 41 | 39 | 78 | 66 | 68 | 31 | 53 | 65 | 74 | 93 | 20 | 44 | 57 |
| | 32 | 33 | 34 | 35 | 36 | 37 | 38 | 39 | 40 | 41 | 42 | 43 | 44 | 45 | 46 | 47 |
| m | 0 | −1 | 0 | 0 | 0 | 0 | 0 | 0 | 0 | 0 | 0 | 0 | 28 | 16 | 11 | 26 |
| n | 65 | 72 | 61 | 51 | 43 | 34 | 43 | 48 | 55 | 37 | 27 | 21 | 29 | 35 | 39 | −18 |
| | 48 | 49 | 50 | 51 | 52 | 53 | 54 | 55 | 56 | | | | | | | |
| m | 10 | 4 | −2 | −11 | 0 | 5 | 5 | 9 | 20 | | | | | | | |
| n | 44 | 58 | 71 | 94 | 0 | 45 | 49 | 45 | 32 | | | | | | | |

Turning to the algorithmic software implementation, a further constant may be defined as the maximum number of partitions in any 4×4 set:
    const UInt NUM_SIG_FLAG_CTX_4×4=9;
Using this constant and the partition set constants defined above, modifications to the TComTrQuant::getSigCtxInc function may be shown as:

```
getSigCtxInc(pcCoeff, uiPosX, uiPosY, uiLog2BlkSize, uiStride, eTType) {
  eTType = eTType == TEXT_LUMA ? TEXT_LUMA : eTType == TEXT NONE ?
    TEXT NONE : TEXT CHROMA
  L_C = eTType != TEXT_LUMA
  uiScanIdx = ((uiLog2BlkSize − 2) << 1) | L_C
  if (uiLog2BlkSize == 2) {
    return CTX IND MAP 4x4 [L C] [(uiPosY << 2) + uiPosX]
  }
  if (uiLog2BlkSize == 3) {
    return NUM_SIG_FLAG_CTX_4×4 + CTX_IND_MAP_8×8 [L_C] [(uiPosY << 3) + uiPosX]
  }
  // The rest of the function is unchanged
}
```

Figure 9:
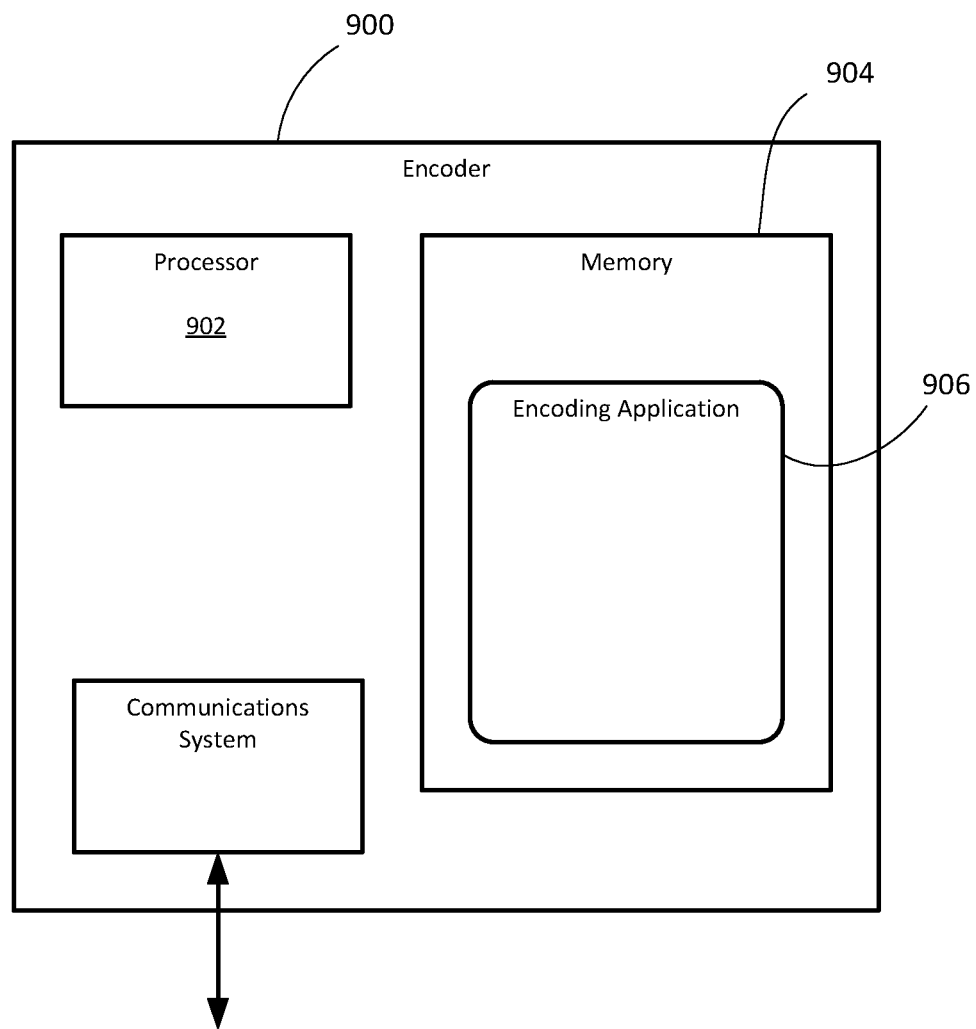
FIG. 9 shows a simplified block diagram of an example embodiment of an encoder.

Reference is now made to FIG. 9, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform steps or operations such as those described herein. For example, the encoding application 906 may encode and output bitstreams encoded in accordance with the adaptive reconstruction level process described herein. The input data points may relate to audio, images, video, or other data that may be subject of a lossy data compression scheme. The encoding application 906 may include a quantization module 908 configured to determine an adaptive reconstruction level for each index of a partition structure. The encoding application 906 may include an entropy encoder configured to entropy encode the adaptive reconstruction levels or RSP data, and other data. It will be understood that the encoding application 906 may be stored in on a computer readable medium, such as a compact disc, flash memory device, random access memory, hard drive, etc.

Figure 10:
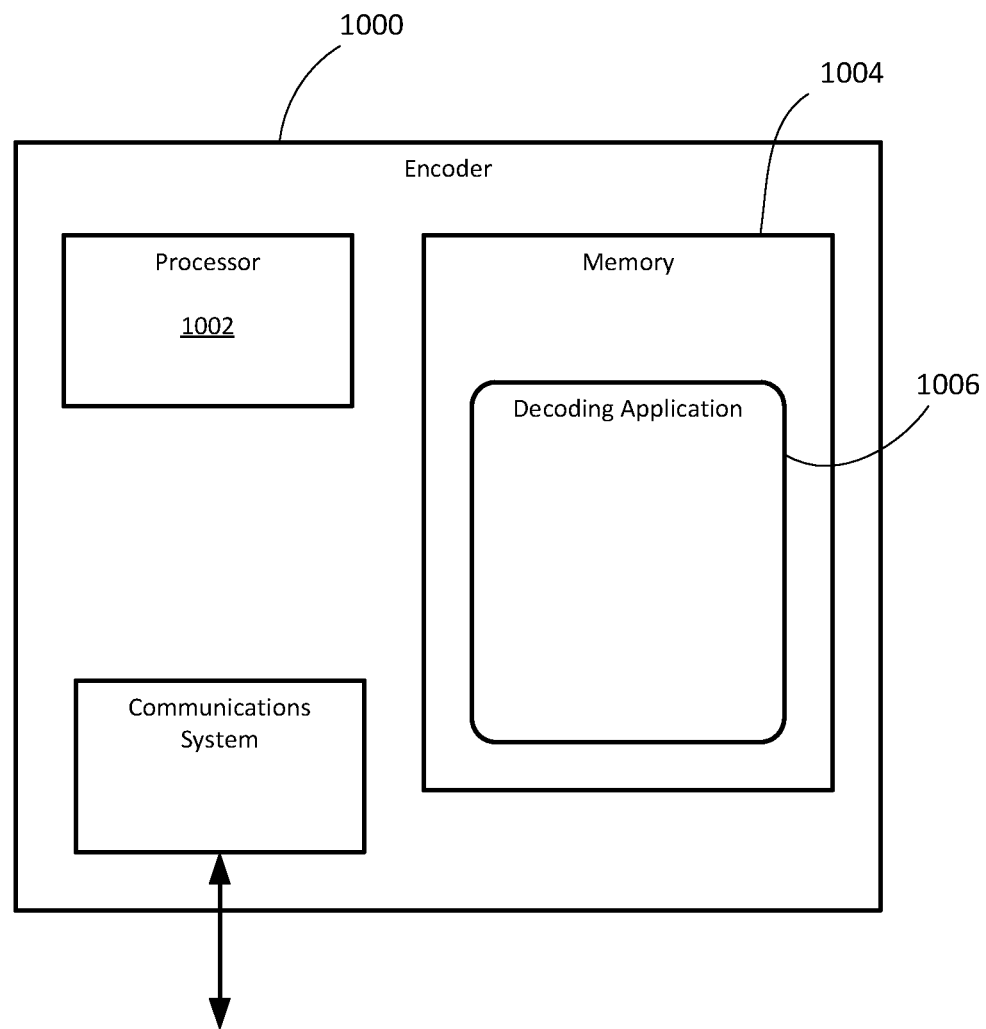
FIG. 10 shows a simplified block diagram of an example embodiment of a decoder.

Reference is now also made to FIG. 10, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform steps or operations such as those described herein. The decoding application 1006 may include an entropy decoder and a de-quantization module 1010 configured to obtain RSP data or adaptive reconstruction levels and use that obtained data to reconstruct transform domain coefficients or other such data points. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of encoding a significance map for a transform unit into a bitstream, the method comprising:
for each bit position in the significance map having a significant coefficient flag that is to be encoded using context-adaptive encoding,
determining a context for that bit position based upon a partition set, wherein the partition set assigns contexts to bit positions within the significance map such that:
each bit position in an upper left quadrant of the significance map is assigned one of at least four contexts,
an upper right and lower left quadrant of the significance map are assigned four to six contexts different from said at least four contexts, wherein each of the four to six contexts is assigned to at least two bit positions, and
a majority of bit positions in a lower right quadrant are assigned a single context;
encoding a bit value for that bit position based on the determined context; and
updating the context based on the encoded bit value for that bit position,
wherein the encoded bit values form the encoded significance map.

2. The method claimed in claim 1, further comprising selecting the partition set from among a plurality of partition sets.

3. The method claimed in claim 2, wherein selecting comprises selecting based on a size of the transform unit.

4. The method claimed in claim 2, wherein selecting comprises selecting based upon text type.

5. The method claimed in claim 1, further comprising initializing the values of each of the contexts associated with the partition set.

6. The method claimed in claim 5, wherein initializing comprises initializing each context value to a uniform state of equiprobability.

7. The method claimed in claim 5, wherein initializing comprises initializing, based on a type of prediction operation, each context to a predetermined probability associated with that context.

8. An encoder for encoding a significance map for a transform unit into a bitstream, the decoder comprising:
a processor;
a memory; and
an encoding application stored in memory and containing instructions that, when executed, cause the processor to:
for each bit position in the significance map having a significant coefficient flag that is to be encoded using context-adaptive encoding,
determine a context for that bit position based upon a partition set, wherein the partition set assigns contexts to bit positions within the significance map such that:
each bit position in an upper left quadrant of the significance map is assigned one of at least four contexts,
an upper right and lower left quadrant of the significance map are assigned four to six contexts different from said at least four contexts, wherein each of the four to six contexts is assigned to at least two bit positions, and
a majority of bit positions in a lower right quadrant are assigned a single context;
encode a bit value for that bit position based on the determined context; and update the context based on the encoded bit value for that bit position,
wherein the encoded bit values form the encoded significance map.

9. The encoder claimed in claim 8, wherein the instructions further cause the processor to select the partition set from among a plurality of partition sets.

10. The encoder claimed in claim 9, wherein the instructions cause the processor to select the partition set based on a size of the transform unit.

11. The encoder claimed in claim 9, wherein the instructions cause the processor to select the partition set based upon text type.

12. The encoder claimed in claim 8, wherein the instructions further cause the processor to initialize the values of each of the contexts associated with the partition set.

13. The encoder claimed in claim 12, wherein the instructions cause the processor to initialize each context value to a uniform state of equiprobability.

14. The encoder claimed in claim 12, wherein the instructions cause the processor to initialize, based on a type of prediction operation, each context to a predetermined probability associated with that context.

15. A non-transitory processor-readable medium storing processor-executable instructions which, when executed, cause one or more processors to encode a significance map for a transform unit into a bitstream by:
for each bit position in the significance map having a significant coefficient flag that is to be encoded using context-adaptive encoding,
determining a context for that bit position based upon a partition set, wherein the partition set assigns contexts to bit positions within the significance map such that:
each bit position in an upper left quadrant of the significance map is assigned one of at least four contexts,
an upper right and lower left quadrant of the significance map are assigned four to six contexts different from said at least four contexts, wherein each of the four to six contexts is assigned to at least two bit positions, and
a majority of bit positions in a lower right quadrant are assigned a single context;
encoding a bit value for that bit position based on the determined context; and
updating the context based on that encoded bit value,
wherein the encoded bit values form the encoded significance map.

16. The non-transitory processor-readable medium claimed in claim 15, wherein the instructions further cause the one or more processors to select the partition set from among a plurality of partition sets.

17. The non-transitory processor-readable medium claimed in claim 16, wherein the instructions cause the one or more processors to select the partition set based on a size of the transform unit.

18. The non-transitory processor-readable medium claimed in claim 16, wherein instructions cause the one or more processors to select the partition set based upon text type.

19. The non-transitory processor-readable medium claimed in claim 15, wherein the instructions further cause the one or more processors to initialize the values of each of the contexts associated with the partition set.

20. The non-transitory processor-readable medium claimed in claim 19, wherein the instructions cause the one or more processors to initialize each context value to a uniform state of equiprobability.

21. The non-transitory processor-readable medium claimed in claim 19, wherein the instructions cause the one or more processors to initialize, based on a type of prediction operation, each context to a predetermined probability associated with that context.

* * * * *